US 7,880,175 B2

(12) United States Patent
Shin et al.

(10) Patent No.: US 7,880,175 B2
(45) Date of Patent: Feb. 1, 2011

(54) UV LIGHT-BLOCKING MATERIAL WITH METAL NANOPARTICLES

(75) Inventors: Hyeon Jin Shin, Suwon-si (KR); Jae Young Choi, Suwon-si (KR); In Yong Song, Suwon-si (KR); Dong Kee Yi, Seoul (KR); Seong Jae Choi, Seoul (KR); Seon Mi Yoon, Yongin-si (KR)

(73) Assignee: Samsung Advanced Institute of Technology (KR)

( * ) Notice: Subject to any disclaimer, the term of this patent is extended or adjusted under 35 U.S.C. 154(b) by 579 days.

(21) Appl. No.: 11/939,489

(22) Filed: Nov. 13, 2007

(65) Prior Publication Data
US 2008/0166506 A1 Jul. 10, 2008

(30) Foreign Application Priority Data
Jan. 10, 2007 (KR) .................. 10-2007-0002914

(51) Int. Cl.
*G02F 1/17* (2006.01)
*H01H 9/18* (2006.01)
(52) U.S. Cl. ..................................... 257/78; 200/314
(58) Field of Classification Search ......... 200/310–317; 341/22; 345/168–184; 257/79
See application file for complete search history.

(56) References Cited
U.S. PATENT DOCUMENTS 5,635,927 A * 6/1997 Lin .............................. 341/22
6,869,596 B1 * 3/2005 Knowland et al. ............ 424/59
7,369,094 B2 * 5/2008 Song et al. ................... 343/816
7,423,229 B2 * 9/2008 Chen ........................... 200/314
7,531,847 B2 * 5/2009 Shitagaki et al. ............ 257/100
7,635,819 B2 * 12/2009 Lee et al. ..................... 200/313
7,683,279 B2 * 3/2010 Kim ............................ 200/310
2006/0063880 A1 * 3/2006 Khanna ....................... 524/494
2007/0295968 A1 * 12/2007 Tan et al. ...................... 257/79
2008/0087533 A1 * 4/2008 Choi et al. ................... 200/311
2009/0202714 A1 * 8/2009 Mandzy et al. ............. 427/164
2009/0218939 A1 * 9/2009 Shitagaki et al. ............ 313/504
2009/0233098 A1 * 9/2009 Kambe et al. ............... 428/402

FOREIGN PATENT DOCUMENTS

| EP | 1220234 A1 | 7/2002 |
| KR | 1020020082633 A | 10/2002 |
| KR | 1020050101019 A | 10/2005 |
| KR | 1020050105098 A | 11/2005 |

\* cited by examiner

Primary Examiner—Michael A Friedhofer
(74) Attorney, Agent, or Firm—Cantor Colburn LLP

(57) ABSTRACT

Disclosed herein is an ultraviolet (UV) light-blocking composition comprising a metal nanoparticle that absorbs and blocks a UV light wavelength using a surface plasmon-absorbing wavelength, and a dielectric. The UV light-blocking composition is capable of absorbing and blocking a UV light wavelength or, a specific wavelength, using the surface plasmon-absorbing wavelength of the metal nanoparticle or, the plasmon-absorbing wavelength transited by the dielectric, thereby demonstrating increased visibility when applied to an image display apparatus such as a mobile phone, and the like.

4 Claims, 3 Drawing Sheets

UV LIGHT-BLOCKING MATERIAL WITH METAL NANOPARTICLES

CROSS-REFERENCE TO RELATED APPLICATIONS

This application claims priority to Korean Patent Application No. 10-2007-0002914, filed on Jan. 10, 2007, in the Korean Intellectual Property Office, and all the benefits accruing therefrom under 35 U.S.C. §119, the entire contents of which is incorporated herein by reference.

BACKGROUND OF THE INVENTION

1. Field of the Invention

The present invention relates to an ultraviolet (UV) light-blocking material, and more particularly, to a UV light-blocking composition comprising metal nanoparticles. Exemplary embodiments of the present invention relate to an image display apparatus including the UV light-blocking composition, which can comprise a metal nanoparticle that absorbs and blocks a UV light; and, a dielectric, thereby effectively blocking UV light and demonstrating increased visibility when applied to an image display apparatus such as a mobile phone, and the like.

2. Description of Related Art

Technological improvements are constantly desired in order to improve the system performance of various image display apparatuses such as, for example, mobile phones, including a Digital Multimedia Broadcasting (DMB) phones, and the like, personal computers (PC), wireless broadband Internet (WiBro) terminals, superhigh speed data communication terminals, telematics terminals, digital versatile disc (DVD) portable players, navigation systems, and the like.

One area requiring technological improvement relates to the color intended to originally show in an image display apparatus. Frequently this color cannot be accurately embodied. For example, UV light is frequently leaked out of the light source of a UV light-emitting device in an image display apparatus using the UV light-emitting device, and the like, are generated. In particular, the phenomenon may be significantly increased in an image display apparatus using a plurality of light-emitting devices. The color being intended to show when applying the light source of each light-emitting device, is not accurately embodied, as the color is transmuted due to the influence of the light source from light-emitting devices that are different from each other or, due to the interference of material in a light filter layer used for optimizing each light-emitting device.

In a sensor field, a biomolecule combination affinity or the content of a detected material is measured using surface plasmon resonance (SPR). Herein, surface plasmon is a light-electromagnetic (EM) effect shown in a metal such as gold, and the like wherein a resonance phenomenon is generated in which most light energy is transited to a free electron when light of a specific wavelength is irradiated on the metal. The phenomenon, which is generated when a surface wave is formed as a result, is referred to as "SPR". In this instance, incident light is not changed into reflected light, and is instead transmitted along a surface. Since the resonance wavelength is shifted depending on a quantitative change in the material composition at a sample surface united with the metal, the phenomenon can be advantageously used in a biosensor. For example, a sensor uses the principle that as a biomolecule combination formed on the surface increases, there is an increase in the wavelength to larger lengths (shorter frequencies), and a quantitative result can consequently be obtained.

The wavelength transition generated is dependent on the metal type, the size of a metal particle, whether the metal is coated, and the dielectric constant of the coating material in a surface plasmon-absorbing wavelength. The location of a surface plasmon-absorbing peak can be predicted by a well-known Mie resonance condition shown in Equation 1 below.

$$\epsilon_1(\omega_s) + 2\epsilon_m(\omega_s) = 0 \quad \text{[Equation 1]}$$

In Equation 1, $\epsilon_1$ is a dielectric constant of a metal particle, $\epsilon_m$ is a dielectric constant of a surrounding dielectric, and $\omega_s$ is a frequency of SPR.

For example, silver, gold, and copper respectively absorb surface plasmons at about 400 nm, about 530 nm, and about 570 nm. Thus, the smaller the size a metal particle is, the shorter the wavelengths that are transmitted. Also, when gold is coated with silicon dioxide ($SiO_2$), a wavelength is transited from about 510 nm to about 540 nm, and when gold is coated with titanium dioxide ($TiO_2$), a wavelength is transited to about 640 nm, since the dielectric constant of $TiO_2$ is higher than the dielectric constant of $SiO_2$ (Minyung Lee et al, "Third-order optical nonlinearities of sol-gel-processed Au—SiO2 thin films in the surface plasmon absorption region", J. of Non-Crystalline Solids 211(1997), 143-149). Further, a wavelength can be transited at less than about 425 nm when silver is coated with $SiO_2$.

However, SPR technology is currently limited within the sensor field, or it is localized. Also, SPR technology is not used for the purpose of absorbing and blocking a specific wave in an image display apparatus.

Thus, there is therefore a need to develop a technology that uses the SPR of a metal particle as a UV light wavelength-absorbing material in order to improve the visibility of an image display apparatus, and the like.

BRIEF SUMMARY

In one embodiment, the present invention provides an ultraviolet (UV) light-blocking composition which can absorb and block a UV light wavelength or, a specific wavelength such as a violet color wavelength, using a surface plasmon-absorbing wavelength of a metal nanoparticle.

In another embodiment, the present invention also provides an image display apparatus which can coat a dielectric on a metal nanoparticle or generate a multi-layered structure, thereby transiting a surface plasmon-absorbing wavelength to a desirable wavelength location, absorbing and blocking a UV light wavelength or a specific wavelength, and improving visibility.

In yet another embodiment, the present invention also provides a keypad assembly of an electronic apparatus which can absorb and block a UV light wavelength or, a specific wavelength, using the surface plasmon-absorbing wavelength transition of a metal nanoparticle or surface plasmon-absorbing wavelength transition by a dielectric, thereby blocking leakage of a specific wavelength such as a violet color wavelength, and the like, when a UV light-emitting device emits light.

In accordance with another aspect of the present invention, there is provided a UV light-blocking composition comprising a metal nanoparticle that absorbs and blocks a UV light wavelength using a surface plasmon-absorbing wavelength, and a dielectric, wherein the metal nanoparticle comprises at least one selected from the group consisting of gold (Au), platinum (Pt), palladium (Pd), iridium (Ir), rhodium (Rh), silver (Ag), ruthenium (Ru), aluminium (Al), copper (Cu), tellurium (Te), bismuth (Bi), lead (Pb), iron (Fe), cerium (Ce), molybdenum (Mo), niobium (Nb), tungsten (W), antimony (Sb), tin (Sn), vanadium (V), manganese (Mn), nickel (Ni), cobalt (Co), zinc (Zn), titanium (Ti) and a combination comprising at least one of the foregoing.

In one embodiment, the metal nanoparticle may be coated by the dielectric.

In another embodiment, the UV light-blocking material may include a structure formed by stacking a layer, which includes the dielectric, on another layer, which includes the metal nanoparticle.

Any dielectric material known in the art may be used in the present invention. For example, the dielectric is at least one selected from the group consisting of: an inorganic particle such as silicon dioxide ($SiO_2$), titanium dioxide ($TiO_2$) and the like; an organic/inorganic-complex compound such as silsesquioxane; and an organic polymer such as polystyrene and the like. There is no particular limitation on the type of dielectric used. Also, the present invention may transit the location of a surface plasmon-absorbing wavelength to a desirable wavelength location, by appropriately selecting the dielectric in which the dielectric constant is different. Also, the present invention may transit a location of a surface plasmon-absorbing wavelength to a desirable wavelength location, by changing a variable such as the particle size of a metal nanoparticle, the volume ratio, and the like.

In one embodiment, a UV light-blocking material may absorb and block a wavelength of about 400 nm to about 500 nm.

In another embodiment, the metal nanoparticle may comprise Ag. In this instance, an Ag nanoparticle may absorb and block a wavelength of about 400 nm to about 430 nm by coating or stacking a particle size or a dielectric.

In yet another embodiment, the UV light-blocking composition is used for an image display apparatus.

According to another aspect of the present invention, there is provided a keypad assembly of an electronic apparatus, which includes: a plurality of light-emitting devices; a light guide plate in which directs light exiting from the plurality of light-emitting devices; a plurality of key buttons which is provided on an upper surface of the light guide plate and includes a number keyboard and a word keyboard; a plurality of reflection patterns which are provided on the light guide plate and reflects light to the plurality of key buttons; a plurality of protrusions provided in a lower portion of a singular reflection pattern, from among the plurality of reflection patterns; and a switch substrate including a plurality of switches corresponding to the plurality of protrusions. In one embodiment, a lower portion of the number keyboard in the plurality of key buttons includes: a color-converting light filter layer which changes light into various colors and reacts or does not react depending on a wavelength of light formed from the light-emitting devices; and, a UV light-blocking light filter layer which absorbs and blocks a UV light wavelength.

In one embodiment, the UV light-blocking light filter layer includes a metal nanoparticle that absorbs and blocks a UV light wavelength using a surface plasmon-absorbing wavelength, and a dielectric, wherein the metal nanoparticle comprises at least one selected from the group consisting of Au, Pt, Pd, Ir, Rh, Ag, Ru, Al, Cu, Te, Bi, Pb, Fe, Ce, Mo, Nb, W, Sb, Sn, V, Mn, Ni, Co, Zn, Ti, and a combination comprising at least one of the foregoing.

In another embodiment, the metal nanoparticle may be coated by the dielectric, and the UV light-blocking light filter layer may include a structure formed by stacking a layer, which includes the dielectric, on another layer, which includes the metal nanoparticle.

In yet another embodiment, the UV light-blocking light filter layer may absorb and block a wavelength of about 400 nm to about 500 nm.

In yet another embodiment, the metal nanoparticle may comprise Ag.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Hereinafter, reference will be made to exemplary embodiments of the present invention. Exemplary embodiments are described in detail below with reference to the accompanying figures.

Figure 1:
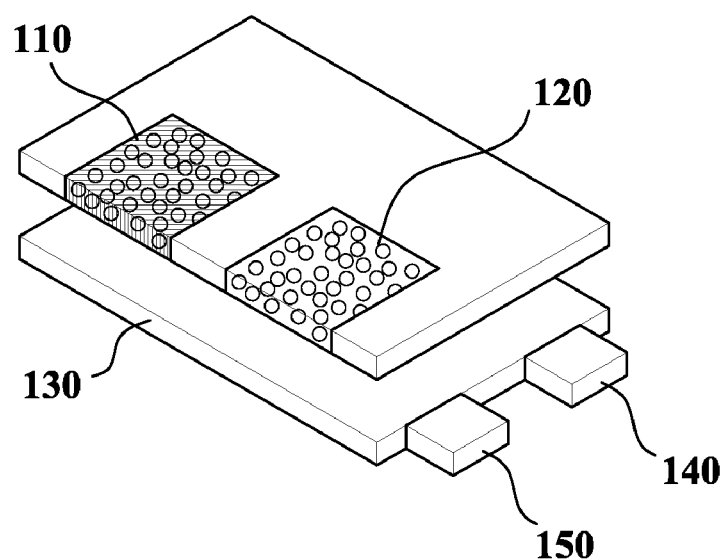
FIG. 1 is a diagram illustrating an exemplary embodiment of a configuration of a keypad assembly which may selectively illuminate words or numbers depending on the usage mode.
Figure 2:
FIG. 2 is an example of an exemplary embodiment of a keypad assembly using an ultraviolet (UV) light-blocking composition including a metal nanoparticle according to the present invention wherein a number is lighted by a phosphor particle of a number keyboard.
Figure 3:
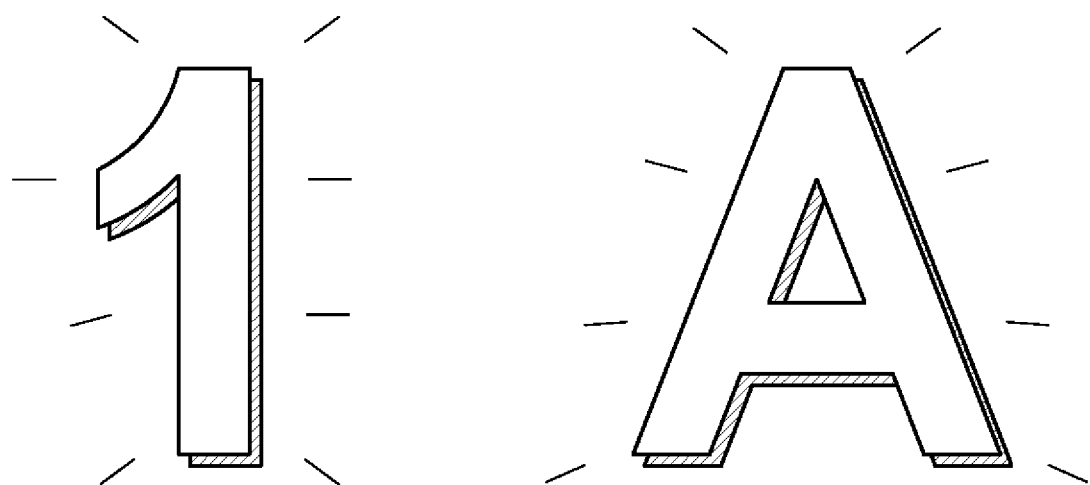
FIG. 3 is an example of an exemplary embodiment of a keypad assembly using an ultraviolet (UV) light-blocking composition including a metal nanoparticle according to the present invention, wherein a number and a letter are lighted when a white light-emitting device emits light; and, FIG. 4 is a graph illustrating an exemplary embodiment of a wavelength strength measurement spectrum which shows that a UV light wavelength is absorbed and blocked by a UV light-blocking composition comprising a metal nanoparticle. An enlarged portion of the graph is shown in which the wavelength strength (y-axis) is less than or equal to 100.

FIGS. 1 through 3 are diagrams illustrating exemplary embodiments of a configuration of a keypad assembly which may selectively illuminate words or numbers depending on a usage mode, as an example of a keypad assembly using an ultraviolet (UV) light-blocking composition comprising a metal nanoparticle. As illustrated in FIG. 1, the configuration of a keypad assembly includes a UV light-emitting device (140) and, a white light-emitting device (150). Also, a lower portion of the number keyboard (110) in the plurality of key buttons, includes a color-converting light filter layer which reacts or does not react depending on a wavelength of light formed from the light-emitting devices 140 and 150 and, includes a phosphor particle (shown as a spherical particle) which changes light into various colors, and a lower portion of the word keyboard 120 in the plurality of key buttons includes a UV light-blocking light filter layer including a metal nanoparticle (shown as a spherical particle) which absorbs and blocks a UV light wavelength. Specifically, as illustrated in FIG. 2, when a UV light-emitting device emits light, a number is lighted by a phosphor particle of a number keyboard and, as illustrated in FIG. 3, when a white light-emitting device emits light, a number and a word are lighted. The present exemplary embodiment may prevent the leakage of a violet color by forming a UV light-blocking light filter layer, thereby absorbing and blocking a violet wavelength when a UV light-emitting device emits light.

The present exemplary embodiment may additionally use a light filter layer controlling a white color in order to increase a white light-maintaining effect in an image display apparatus such as a keypad assembly. Herein, any layer that may transmit white light and ultimately embody a white color in an image display unit, may be used for the light filter layer controlling the white color. As an example of the light filter layer controlling the white color, is a color filter layer such as a blue color filter. In one embodiment, the type of color filter used in the color filter layer is not particularly limited, and may be appropriately selected to a range in which a white color may be embodied, and may be controlled. Also, any material may be used for the color filter layer regardless of whether it is organic matter or inorganic matter.

According to the present exemplary embodiment, a plurality of light-emitting devices in a keypad assembly of an electronic apparatus includes a UV light-emitting device and, a white light-emitting device. A wavelength of light exited from the UV light-emitting device may range from about 320 nm to about 450 nm. A center wavelength may range from about 380 nm to about 420 nm or, from about 350 nm to about 450 nm. Preferably, a center wavelength may be about 400 nm, and is not limited thereto. A wavelength and, a location of a center wavelength, are determined depending on the type and quality of light source used for a UV light-emitting device.

According to another aspect of the present invention, the color-converting light filter layer used for the keypad assembly of the electronic apparatus, includes a phosphor which emits light as a red color (R), a green color (G), and a blue color (B). Also, the color-converting light filter layer emits light of various colors by reacting with the light exiting from the UV light-emitting device and mixing each color. Additionally, the color-converting light filter layer emits white light without reacting with the white light exiting from the white light-emitting device.

According to one embodiment of the present invention, with regard to a UV light-blocking composition comprising a metal nanoparticle, the content of the metal nanoparticle and the thickness of the UV light-blocking material are not particularly limited, and may be appropriately controlled depending on the type, quality, and strength of the source of UV light for which it is intended to absorb and block.

Hereinafter, exemplary embodiments of the present invention are described in detail with reference to the following examples. These examples are provided for the purpose of illustration and thus are not to be construed as limiting the scope of the invention.

EXAMPLES

Example 1

Exemplary embodiments were prepared as illustrated in Table 1 as follows. Specifically, after a first layer was formed by mixing an amount of a silver solution including 1% by weight content of toluene, with a transparent ink (binder; using CNI INS-000 INK manufactured by Nokwon Co.), and performing dispersion using a milling machine, a $TiO_2$ layer (binder 1 g+$TiO_2$ 1 g) was then coated as a dielectric on the first layer. As a result, UV light-blocking complex layers, including a silver nanoparticle, were manufactured.

TABLE 1

| Number | "Silver solution (μl) (including silver of 1% by weight and toluene 99% by weight as a solvent) | Binder (g) |
|---|---|---|
| First exemplary embodiment | 10 | 1 |
| Second exemplary embodiment | 30 | 1 |
| Third exemplary embodiment | 50 | 1 |
| Fourth exemplary embodiment | 100 | 1 |
| Fifth exemplary embodiment | 200 | 1 |

Figure 4:
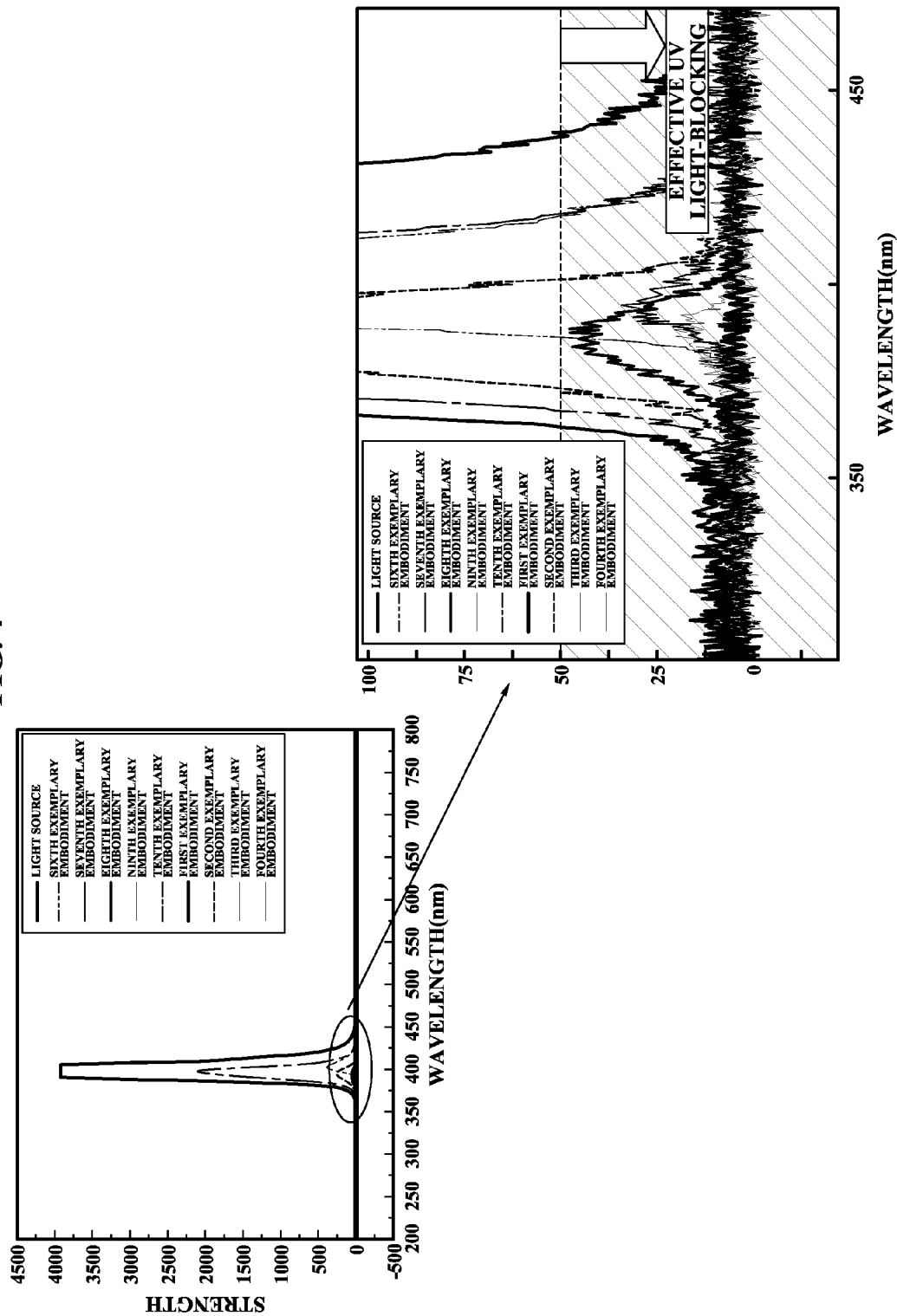

FIG. 4 is a graph illustrating a wavelength strength measurement spectrum that shows that a UV light wavelength is absorbed and blocked by a UV light-blocking material including a metal nanoparticle. An enlarged portion of the graph is also provided in which the wavelength strength (y-axis) shown is less than or equal to 100.

In order to check the UV light-blocking effect of a silver nanoparticle, the strength of transmitted light was measured when a UV light-blocking complex layer, manufactured according to Exemplary embodiments 1 through 5, was placed on a UV light-emitting device (a center wavelength: 400 nm) and UV light was emitted. Also, the observation was made as to whether white light was maintained when a UV light-blocking film was placed on a white light-emitting device. In this example, the strength of transmitted light was measured using an Ocean Optics USB 100 detector, and the results are described in Table 2 as follows, and in FIG. 4. In Table 2, the strength of light, emitted from a UV light-emitting device in a state where the UV light-blocking film is not placed on the white light-emitting device, is shown as Comparative experimental example 1. In Table 2, a UV light-blocking effect and a white light-maintaining effect are shown as follows: a sample having no UV light-blocking effect is shown as X, a sample having a partial UV light-blocking effect is shown as Δ, a sample having a great UV light-blocking effect is shown as O, and a sample having a significantly great UV light-blocking effect is shown as ⊚.

TABLE 2

| Experimental number | Sample | Strength of UV light-emitting device (PL intensity) | UV light-blocking effect | White light-maintaining effect |
|---|---|---|---|---|
| Comparative experimental example 1 | Light source | >4000 | — | — |
| Experimental example 1-a | First exemplary embodiment | ~2000 | X | Δ |
| Experimental example 1-b | Second exemplary embodiment | ~250 | Δ | Δ |
| Experimental example 1-c | Third exemplary embodiment | ~50 | O | Δ |
| Experimental example 1-d | Fourth exemplary embodiment | ~20 | O | X |
| Experimental example 1-e | Fifth exemplary embodiment | — | — | X |

As illustrated in FIG. 4, when a UV light-blocking complex layer including a silver nanoparticle was used, a wavelength of about 400 nm to about 420 nm was absorbed by a surface plasmon-absorbing wavelength of the silver nanoparticle. It is obvious to those of ordinary skill in the art that that the leakage of a violet color (wavelength of about 400 nm) was prevented as a result.

Example 2

As illustrated in Table 3, UV light-blocking films including a silver nanoparticle in which a dielectric $TiO_2$ was coated, were manufactured by mixing $TiO_2$ and a silver solution, including 1% by weight content of toluene, with a transparent ink (binder; using CNI INS-000 INK manufactured by Nokwon Co.), and performing dispersion using a milling machine.

In Exemplary embodiments 6 through 10, the silver nanoparticle and the dielectric $TiO_2$ are used altogether, thereby having both a UV light-blocking effect and a white light-maintaining effect.

TABLE 3

| Number | Silver solution (μl) (including silver of 1% by weight and toluene 99% by weight as a solvent) | $TiO_2$ (g) | Binder (g) |
|---|---|---|---|
| Sixth exemplary embodiment | 10 | 1 | 1 |
| Seventh exemplary embodiment | 30 | 1 | 1 |
| Eighth exemplary embodiment | 50 | 1 | 1 |
| Ninth exemplary embodiment | 100 | 1 | 1 |
| Tenth exemplary embodiment | 200 | 1 | 1 |

In order to check the UV light-blocking effect of a UV light-blocking film manufactured by Exemplary embodiments 6 through 10, the strength of transmitted light was measured when a UV light-blocking film (Exemplary embodiments 6 through 10) was placed on a UV light-emitting device (a center wavelength: 400 nm) and UV light was emitted. Also, the observation was made as to whether white light was maintained when a UV light-blocking film is placed on a white light-emitting device. In this example, the strength of light was measured using an Ocean Optics USB 100 detector, and the result thereof are described in Table 4 below, and FIG. 4. In Table 4, the strength of light, which was measured when a UV light-emitting device emits light in a state where the UV light-blocking film is not placed on the white light-emitting device, is shown as Comparative experimental example 1. In Table 4, the UV light-blocking effect and the white light-maintaining effect are shown as follows: a sample having no UV light-blocking effect is shown as X, an sample having a partial UV light-blocking effect is shown as Δ, a sample having a great UV light-blocking effect is shown as O, and a sample having a significantly great UV light-blocking effect is shown as ⊚.

TABLE 4

| Experimental number | Sample | Strength of UV light-emitting device (PL intensity) | UV light-blocking effect | White light-maintaining effect |
|---|---|---|---|---|
| Comparative experimental example 1 | Light source | >4000 | — | — |
| Experimental example 2-a | Sixth exemplary embodiment | ~380 | Δ | O |
| Experimental example 2-b | Seventh exemplary embodiment | ~30 | O | Δ |
| Experimental example 2-c | Eighth exemplary embodiment | ~0 | ⊚ | X |
| Experimental example 2-d | Ninth exemplary embodiment | ~0 | ⊚ | X |
| Experimental example 2-e | Tenth exemplary embodiment | ~0 | ⊚ | X |

As illustrated in Table 4 and FIG. 4, a wavelength of about 400 nm to about 420 nm was absorbed by a surface plasmon-absorbing wavelength of the silver nanoparticle, and the leakage of a violet color was prevented as a result. It is obvious to those of ordinary skill in the art that a white light-maintaining effect was also obtained. In addition, a white light-maintaining effect may be controlled more accurately using a color filter, and the like.

According to the present exemplary embodiment of the present invention, the content of the metal nanoparticle and the thickness of the UV light-blocking material, in a UV light-blocking composition comprising a metal nanoparticle, are not particularly limited, and may be appropriately controlled depending on the type, quality, and strength of the UV light source of which it is intended to absorb and block.

According to the exemplary embodiments of the present invention, an UV light-blocking composition may include a metal nanoparticle that absorbs and blocks a UV light wavelength using a surface plasmon-absorbing wavelength, thereby effectively absorbing and blocking the UV light wavelength.

Also, in accordance with the exemplary embodiments of the present invention, an UV light-blocking composition may control the size of a metal nanoparticle or the volume content, or transit a surface plasmon-absorbing wavelength to a desirable wavelength location by coating of an appropriately selected dielectric or, by stacking the dielectric, thereby absorbing and blocking a specific wavelength.

According to the exemplary embodiments of the present invention an UV light-blocking composition may also absorb and block a IN light wavelength or, a specific wavelength, using the surface plasmon-absorbing wavelength transition of a metal nanoparticle or, the surface plasmon-absorbing wavelength transition by a dielectric. The UV light blocking composition may thereby be applied to an image display apparatus and the like, and effectively improves visibility.

Also, in accordance with the exemplary embodiments of the present invention, a keypad assembly of an electronic apparatus may absorb and block a UV light wavelength or, a specific wavelength, using the surface plasmon-absorbing wavelength transition of a metal nanoparticle or, the surface plasmon-absorbing wavelength transition by a dielectric, thereby blocking leakage of a violet color when a UV light-emitting device emits light.

Also, in accordance with the exemplary embodiments of the present invention, an image display apparatus such as a keypad assembly may be appropriately used in combination with a color filter, thereby effectively blocking a UV light and displaying a relatively more vivid white light.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An ultraviolet (UV) light-blocking composition comprising:
   a metal nanoparticle that absorbs and blocks a UV light wavelength using a surface plasmon-absorbing wavelength; and,
   a dielectric,
   wherein the metal nanoparticle includes Ag.

2. An ultraviolet (UV) light-blocking composition comprising:
   a metal nanoparticle that absorbs and blocks a UV light wavelength using a surface plasmon-absorbing wavelength, wherein the metal nanoparticle comprises at least one selected from the group consisting of gold (Au), platinum (Pt), palladium (Pd), iridium (Ir), rhodium (Rh), silver (Ag), ruthenium (Ru), aluminum (Al), copper (Cu), tellurium (Te), bismuth (Bi), lead (Pb), iron (Fe), cerium (Ce), molybdenum (Mo), niobium (Nb), tungsten (W), antimony (Sb), tin (Sn), vanadium (V), manganese (Mn), nickel (Ni), cobalt (Co), zinc (Zn), titanium (Ti), and a combination comprising at least one of the foregoing metals; and,
   a dielectric, wherein the dielectric comprises titanium dioxide ($TiO_2$).

3. A keypad assembly of an electronic apparatus comprising:
   a plurality of light-emitting devices;
   a light guide plate which directs light exiting from the plurality of light-emitting devices;
   a plurality of key buttons comprising a number keyboard and a word keyboard provided on an upper surface of the light guide plate;
   a plurality of reflection patterns which are provided on the light guide plate and which reflect light to the plurality of key buttons;
   a plurality of protrusions provided in a lower portion of a singular reflection pattern from among the plurality of reflection patterns; and
   a switch substrate including a plurality of switches corresponding to the plurality of protrusions, wherein a lower portion of the number keyboard in the plurality of key buttons comprises a color-converting light filter layer which changes light into various colors and which reacts or does not react depending on a wavelength of light formed from the light-emitting devices; and wherein the lower portion of the word keyboard in the plurality of key buttons comprising a UV light-blocking light filter layer which absorbs and blocks a UV light wavelength,
   wherein the UV light-blocking light filter layer comprises a metal nanoparticle that absorbs and blocks a UV light wavelength using a surface plasmon-absorbing wavelength; and a dielectric, wherein the metal nanoparticle comprises Ag.

4. A keypad assembly of an electronic apparatus comprising:
   a plurality of light-emitting devices;
   a light guide plate which directs light exiting from the plurality of light-emitting devices;
   a plurality of key buttons comprising a number keyboard and a word keyboard provided on an upper surface of the light guide plate;
   a plurality of reflection patterns which are provided on the light guide plate and which reflect light to the plurality of key buttons;
   a plurality of protrusions provided in a lower portion of a singular reflection pattern from among the plurality of reflection patterns; and
   a switch substrate including a plurality of switches corresponding to the plurality of protrusions, wherein a lower portion of the number keyboard in the plurality of key buttons comprises a color-converting light filter layer which changes light into various colors and which reacts or does not react depending on a wavelength of light formed from the light-emitting devices; and wherein the lower portion of the word keyboard in the plurality of key buttons comprising a UV light-blocking light filter layer which absorbs and blocks a UV light wavelength,
   wherein the UV light-blocking light filter layer comprises a metal nanoparticle that absorbs and blocks a UV light wavelength using a surface plasmon-absorbing wavelength, wherein the metal nanoparticle comprises at least one selected from the group consisting of Au, Pt, Pd, Ir, Rh, Ag, Ru, Al, Cu, Te, Bi, Pb, Fe, Ce, Mo, Nb, W, Sb, Sn, V, Mn, Ni, Co, Zn, Ti, and a combination comprising at least one of the foregoing metal; and a dielectric, wherein the dielectric comprises $TiO_2$.

* * * * *